(12) United States Patent
Tamaoki

(10) Patent No.: US 7,383,662 B2
(45) Date of Patent: Jun. 10, 2008

(54) GLASS RUN FOR MOTOR VEHICLE WITH DOOR GLASS SHOCK ABSORBER

(75) Inventor: Kiyotaka Tamaoki, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/373,956

(22) Filed: Mar. 14, 2006

(65) Prior Publication Data

US 2006/0218865 A1 Oct. 5, 2006

(30) Foreign Application Priority Data

Mar. 31, 2005 (JP) ............................. 2005-100732

(51) Int. Cl.
  *E05D 15/16* (2006.01)
(52) U.S. Cl. .................... 49/441; 49/440; 49/489.1; 49/428
(58) Field of Classification Search ................ 49/414, 49/415, 428, 440, 441, 442, 489.1, 495.1, 49/475.1
See application file for complete search history.

(56) References Cited

U.S. PATENT DOCUMENTS

| 4,663,888 | A | * | 5/1987 | Okamoto | 49/441 |
| 4,947,586 | A | * | 8/1990 | Mesnel et al. | 49/490.1 |
| 6,023,888 | A | * | 2/2000 | Dover | 49/441 |
| 6,082,048 | A | * | 7/2000 | Backes et al. | 49/377 |
| 6,493,992 | B2 | | 12/2002 | Goto | |
| 6,708,450 | B2 | * | 3/2004 | Tanaka et al. | 49/441 |
| 2004/0134132 | A1 | * | 7/2004 | Baumann | 49/441 |
| 2004/0237412 | A1 | | 12/2004 | Aritake et al. | |
| 2005/0095397 | A1 | | 5/2005 | Omori et al. | |
| 2005/0120633 | A1 | | 6/2005 | Takase et al. | |
| 2005/0166459 | A1 | * | 8/2005 | Watanabe et al. | 49/415 |
| 2006/0026903 | A1 | * | 2/2006 | Nozaki et al. | 49/441 |
| 2006/0064936 | A1 | * | 3/2006 | Shiraiwa et al. | 49/441 |
| 2006/0086053 | A1 | * | 4/2006 | Ellis | 49/441 |
| 2006/0248802 | A1 | * | 11/2006 | Tamaoki et al. | 49/441 |

FOREIGN PATENT DOCUMENTS

| JP | A-60-213524 | 10/1985 |
| JP | U-S62-413 | 1/1987 |
| JP | Y2-H02-15694 | 4/1990 |
| JP | H2-8-318740 | 12/1996 |
| JP | A-9-104236 | 4/1997 |
| JP | Y2-2578541 | 5/1998 |
| JP | A-2000-085373 | 3/2000 |
| JP | A-2002-187432 | 7/2002 |
| JP | A-2002-200922 | 7/2002 |
| JP | A-2003-252064 | 9/2003 |

* cited by examiner

*Primary Examiner*—Gregory J. Strimbu
(74) *Attorney, Agent, or Firm*—Posz Law Group, PLC

(57) ABSTRACT

A glass run for use in a motor vehicle includes an outer side wall, an inner side wall and a bottom wall and has a generally U-shaped cross-section. An outer seal lip and an inner seal lip project from distal ends of the outer side wall and the inner sidewall into an interior of the glass run. The bottom wall has a shock absorbing lip which obliquely projects from one side end thereof into the interior of the glass run. And a depressed part is fanned in an exterior surface of the bottom wall for defining a space with the door frame, and a cushioning member is secured in the depressed part of the bottom wall.

5 Claims, 7 Drawing Sheets

GLASS RUN FOR MOTOR VEHICLE WITH DOOR GLASS SHOCK ABSORBER

CROSS-REFERENCE TO RELATED APPLICATION

This application is related to and claims priority from Japanese patent Application No. 2005-100732 incorporated herein by reference.

BACKGROUND OF THE INVENTION

1. Field of the Invention

The present invention relates to a glass run for attachment to an inner periphery of a door frame of a motor vehicle for guiding a door glass as it is raised and lowered.

2. Description of Related Art

As shown in FIG. 1, a glass run 10 is attached to an inner periphery of a door frame 12 of a vehicle door 14 for guiding a door glass 16 which is raised and lowered. FIG. 2 is a cross-sectional view taken along the line 2-2 of FIG. 1, and shows a conventional attaching structure of the glass run 10.

As shown in FIGS. 1 and 2, conventionally, the glass run 10 is fitted in a channel 40 formed in the door frame 12 to guide the door glass 16 upwardly and downwardly, and provide a seal between the door glass 16 and the door frame 12. The glass run 10 is formed by connecting extruded straight parts 18 adapted to be attached along an upper side, a front vertical side and a rear vertical side of the door 14, with corner parts 20, each being formed by molding in conformity with a corner of the door frame 12.

A door weather strip 22 is attached to an outer periphery of the door frame 12, and an opening trim weather strip 24 is attached to a flange provided in a door opening portion of a vehicle body, thereby sealing between the vehicle door 14 and the vehicle body.

As shown in FIG. 2, the glass run 10 includes an outer side wall 26, an inner side wall 28 and a bottom wall 30, and has a generally U-shaped cross-section. An outer seal lip 32 and an inner seal lip 34 respectively extend from open ends of the outer side wall 26 and the inner side wall 28 towards an interior of the glass run 10. And an outer cover lip 36 and an inner cover lip 38 respectively extend from open ends of the outer side wall 26 and the inner side wall 28 towards the bottom wall 30 along exterior surfaces of the outer side wall 26 and the inner side wall 28.

The glass run 10 is attached to the door frame 12 by inserting the outer side wall 26, the inner side wall 28 and the bottom wall 30 in the channel 40 such that the outer cover lip 36 covers a lower end of an outer body panel 42 and the inner cover lip 38 covers a lower end of an inner body panel 44.

When the door glass 16 enters an interior of the glass run 10, an outer periphery of the door glass 16 is sealed and held with the outer seal lip 32 and the inner seal lip 34.

When the door glass 16 is raised to a closed position, an upper end of the door glass 16 pushes the bottom wall 30 of the glass run 10 upwardly. At this time, the bottom wall 30 does not absorb the upward movement of the door glass 16 completely so that the upper end of the door glass 16 pushes the channel 40 via the bottom wall 30 to cause occurrence of noises which degrade driving comfort. When the upper end of the door glass 16 pushes the bottom wall 30, the bottom wall 30 deforms to shift the upper end of the door glass 16 from a prescribed closing position so that the seal lips 32 and 34 may be undesirably deformed to lower the sealing properties.

Accordingly, in order to absorb the upward movement of the door glass, a tubular part has been provided in the bottom wall, or a sponge member has been attached to the bottom wall (see Publication of unexamined patent application No. Hei 8-318740 and Publication of unexamined utility model application No. Sho 62-413, for example). In order to provide a tubular part 46 in the bottom wall 30, as shown in FIG. 3, the hollow extruding method is normally adopted, but in order to keep atmospheric pressure in the tubular part 46 during extrusion, a high level pressure control is needed. Therefore, it is difficult to hold the configuration of the tubular part 46, and it is also difficult to increase the rate of extrusion, whereby preferable productivity is not effected. Where a sponge member is attached to the bottom wall, the sponge member with a great thickness cannot be provided in a narrow space between the bottom wall and the door frame, whereby a sufficient shock absorbing force is not effected. On the other hand, if the sponge member is made thick to increase its shock absorbing force, the stability of the bottom wall relative to the door frame may be degraded.

There has been also proposed to provide a lip in the inner side wall adjacently to the bottom wall for contacting the upper end of the door glass, and absorbing the shock caused by the pushing of the upper end of the door glass (see Publication of examined utility model application No. Hei2-15694, for example) In this case, however, the lip does not exhibit sufficiently high elasticity so that a sufficiently strong shock absorbing force cannot be effected. In addition, where this lip has been used for a long period, it has been repeatedly pushed by the door glass to cause permanent deformation, whereby the shock absorbing effect may be lowered.

There has been also proposed to gradually increase the wall thickness of the bottom wall outwardly for enabling the bottom wall to readily flex and absorb shock caused by the pushing of the upper end of the door glass (see Utility model No. 2578541, for example) In this case, however, the shock caused byte pushing of the door glass cannot be sufficiently absorbed with the flexion of the bottom wall, and it is difficult to obtain a large space enough for the thick bottom wall between the bottom wall and the door frame. Consequently, a sufficiently strong shock absorbing force cannot be effected.

SUMMARY OF THE INVENTION

It is an object of the present invention to provide a glass run for a motor vehicle, which is capable of securely absorbing a shock caused by the pushing of a door glass against a glass run to prevent occurrence of noises when a door glass is raised.

In accordance with a first aspect of the present invention, a glass run for use in a motor vehicle, which is adapted to be attached along an inner periphery of a door frame of a vehicle door for guiding a door glass as it is raised and lowered, includes an outer side wall, an inner side wall and a bottom wall, and has a generally U-shaped cross-section. An outer seal lip and an inner seal lip respectively project from open ends of the outer side wall and the inner side wall into an interior defined by the outer side wall, the inner side wall and the bottom wall. The bottom wall includes a shock absorbing lip which obliquely projects from an inner side end or an outer side end of the bottom wall into the interior thereof, and a depressed part provided in an exterior surface thereof for defining a space with the door frame, and a cushioning member is provided in the depressed part of the bottom wall.

With the first aspect of the invention, the upper end of the door glass is inserted in the interior of the glass run including the outer side-wall, the inner side wall and the bottom wall so that the door glass is securely held with the door. When the door glass is raised and lowered, the outer seal lip and the inner seal lip contact the door glass to provide a seal between the door frame and the door glass.

When the door glass is raised, and an end thereof is inserted in the interior of the glass run, the end of the door glass first contacts and flexes the shock absorbing lip so that the shock caused by the door glass is absorbed with the shock absorbing lip. When the end of the door glass further pushes the shock absorbing lip against the bottom wall, the bottom wall deforms to compress the cushioning member so that a greater shock can be absorbed. By flexing or deforming the shock absorbing lip, the bottom wall and the cushioning member in this order, the shock caused by the pushing of the end of the door glass against the glass run can be securely absorbed stepwise.

It is preferable that the shock absorbing lip curves convexly toward an opening of the glass run.

With this arrangement, when the end of the door glass contacts the shock absorbing lip, a tip end of the shock absorbing lip contacts an interior surface of the bottom wall to define an arc-shaped tubular part between the shock absorbing lip and the bottom wall. And this tubular part is deformed to absorb the shock caused by the pushing of the door glass, thereby increasing a shock absorbing amount.

It is preferable that the bottom wall extends obliquely to the door frame to gradually enlarge the cross-section of the space between the bottom wall and the door frame from the inner side end to the outer side end thereof.

With this arrangement, when the end of the door glass pushes the bottom wall via the shock absorbing lip, the outer side end of the bottom wall flexes upwardly to shift the door glass outwardly. As a result, the level difference between the door glass and the door frame can be reduced. And by virtue of the flection of the outer side end of the bottom wall in addition to the deformation of the cushioning member and the shock absorbing lip, the shock caused by the pushing of the end of the door glass can be greatly absorbed.

It is preferable that the bottom wall is arranged such that when the glass run is attached to the door frame, the inner side end of the bottom wall, which is connected to the inner side wall, contacts the door frame, whereas the outer side part of the bottom wall, which is connected to the outer side wall, does not contact the door frame, and when an end of the door glass pushes the bottom wall, the outer side end of the bottom wall contacts the door frame.

With this arrangement, when the end of the door glass pushes the bottom wall via the shock absorbing lip, the outer side end of the bottom wall flexes upwardly and contacts the door frame. As a result, the door glass shifts outwardly while pushing the bottom wall and the cushioning member, thereby absorbing the shock caused by the pushing of the end of the door glass, and reducing the level difference between the door frame and the door glass. Consequently, air resistance and wind noises which would be caused by such level difference can be reduced.

It is preferable that the bottom wall includes a central part, an outer side part and an inner side part. The outer side part and the inner side part are integrally formed with the central part outside and inside thereof. The outer side part bends upwardly and is connected to a base end of the outer side wall, and a seal lip projects from the outer side part over the depressed part in such a manner as to contact the door frame when an end of the door glass pushes the bottom wall.

With this arrangement, when the glass run is attached to the door frame, the outer side part and the inner side part of the bottom wall readily bend to facilitate the attachment of the glass run. And when the end of the door glass pushes the bottom wall, the outer side part and the inner side part of the bottom wall readily flex to absorb the shock caused by the pushing of the upper end of the door glass.

In addition, since the outer side part of the bottom wall bends upwardly and is connected to the base end of the outer side wall, a space for a thick cushioning member can be provided between an outside end of the central part of the bottom wall and the door frame, whereby the shock absorbing force of the cushioning member can be enhanced, and when the end of the door glass pushes the bottom wall, the upwardly bending outer side part flexes to facilitate the absorption of the shock caused by the pushing of the door glass.

Furthermore, when the end of the door glass pushes the bottom wall, the seal lip projecting from the outer side part of the bottom wall contacts the door frame, and is deformed to further absorb the shock caused by the pushing of the door glass, and improve the sealing properties between the glass run and the door frame.

It is preferable that the bottom wall further includes a projection which obliquely projects from an interior surface of an inner side end or an outer side end of the bottom wall towards the inner side wall or the outer side wall such that when the glass run is attached to the door frame, the projection contacts the inner side wall or the outer side wall.

With this arrangement, when the glass run is attached to the door frame, the projection provided in the bottom wall supports the inner side wall or the outer side wall to prevent the tilting thereof towards an interior of the glass run. In addition, when the door glass enters the glass run, and the inner side wall or the outer side wall is pulled inwardly by the periphery of the door glass, which slides on the inner seal lip or the outer seal lip, the projection provided in the bottom wall supports the inner side wall or the outer side wall to prevent the tilting thereof towards the interior of the glass run.

It is preferable that the shock absorbing lip projects from the inner side end of the bottom wall, and that the bottom wall further includes a projection which obliquely projects from the inner side end of the bottom wall towards the inner side wall such that when the glass run is attached to the door frame, the projection contacts the inner side wall.

Where the glass run has the construction that the inner side wall is much spaced from the closed door glass, as compared with the outer side wall, the inner seal lip contacts the door glass with a great contacting area to pull the inner side wall with a strong force, and the inner side wall has a greater height than the outer side wall, the inner side wall tends to tilt toward the interior of the glass run, as compared with the outer side wall. By virtue of the projection projecting from the bottom wall, the inner side wall can be securely prevented from tilting toward the interior of the glass run.

It is preferable that the bottom wall further includes a protrusion which protrudes from the inner end or the outer end of the interior surface of the bottom wall such that when an end of the door glass contacts the shock absorbing lip, the tip end of the shock absorbing lip engages with the protrusion provided in the bottom wall.

With this arrangement, when the tip end of the shock absorbing lip engages with the protrusion provided in the bottom wall, a tubular part is defined between the shock absorbing lip and the bottom wall. Accordingly, the shock caused by the pushing of the end of the door glass is first absorbed with the flection of the shock absorbing lip toward the bottom wall. And when the shock absorbing lip engages with the protrusion, the shock absorbing lip is flexed to deform the tubular part defined with the shock absorbing lip and the bottom wall.

In addition, since the shock absorbing lip is extruded to a lip-shaped configuration, the glass run can be readily extruded.

It is preferable that the shock absorbing lip has a projection along the tip end thereof for engaging with the protrusion provided in the bottom wall when an end of the door glass contacts the shock absorbing lip.

With this arrangement, the projection provided along the tip end of the shock absorbing lip engages with the protrusion provided in the bottom wall to define the tubular part with the bottom wall more securely. Accordingly, the shock caused by the pushing of the end of the door glass is securely absorbed with the deformation of the tubular part.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
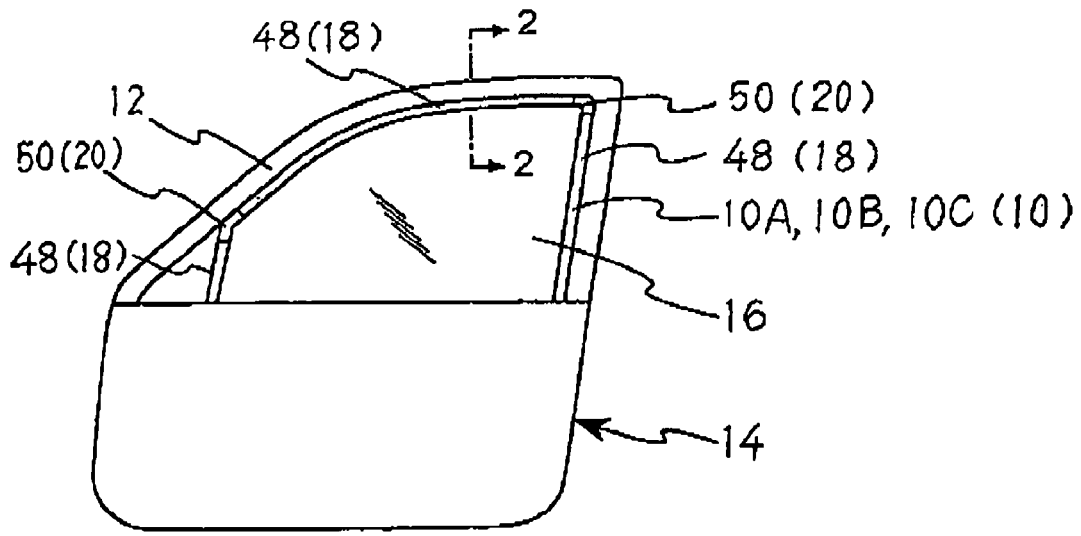
FIG. 1 is a front view of a door of a motor vehicle.
Figure 2:
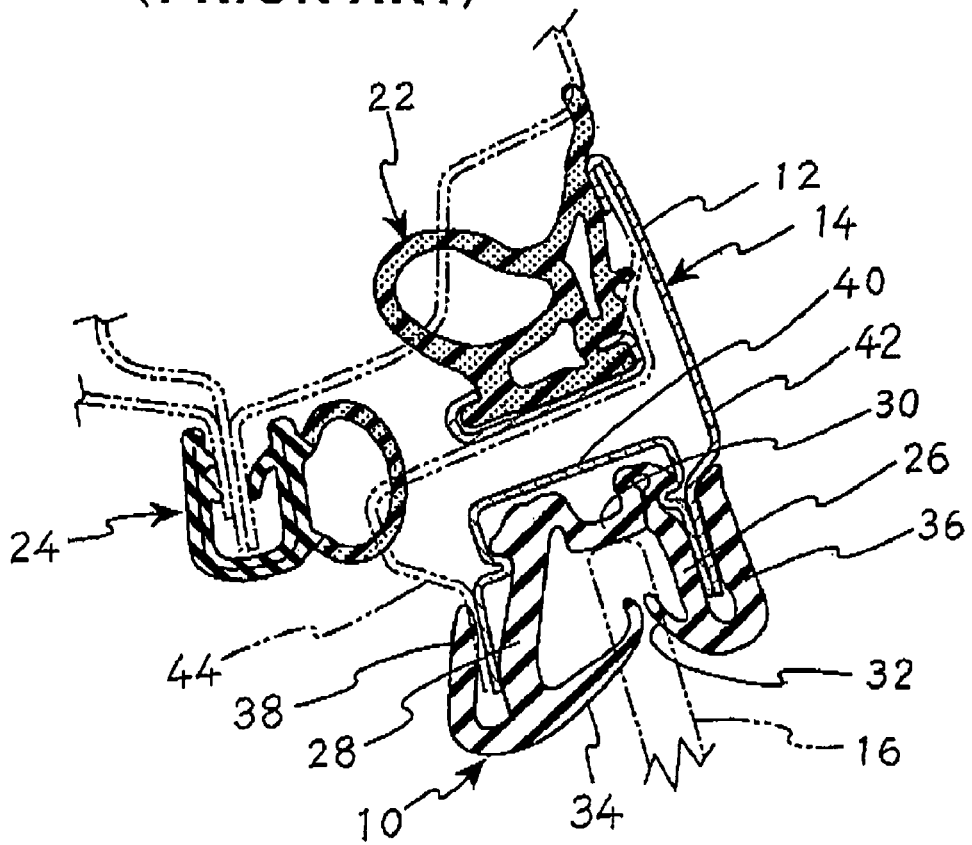
FIG. 2 is a cross-sectional view taken along the line 2-2 of FIG. 1, which shows a conventional glass run attached to a door frame.
Figure 3:
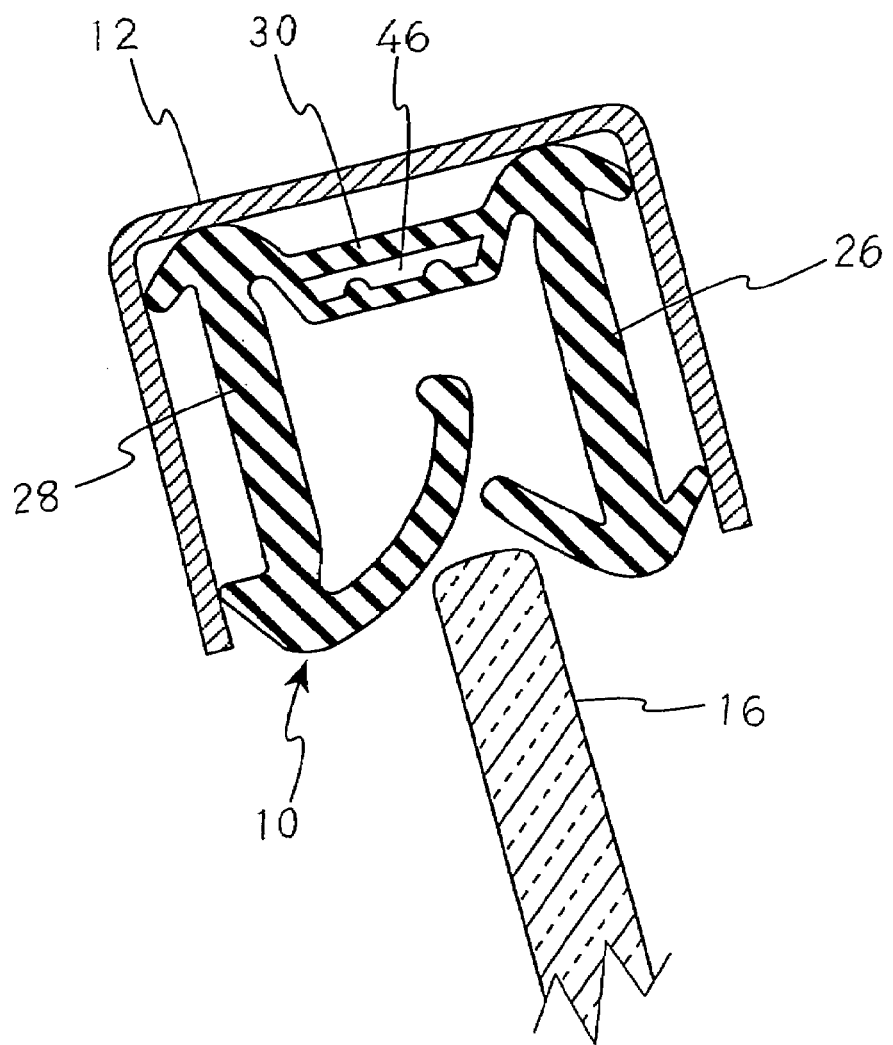
FIG. 3 is a cross-sectional view of another conventional glass run.

A first embodiment of the present invention will be explained with reference to FIGS. 1, 4 and 5. FIG. 1 is a front view of a door 14 of a motor vehicle. As shown, a door frame 12 is provided above a belt line of the door 14, and a door glass 16 is slidably attached along the door frame 12. A glass run 10A is attached to an inner periphery of the door frame 12 to guide the door glass 16 as it is raised and lowered, and seal between the door glass 16 and the door frame 12.

The glass run 10A includes straight parts 48 which are formed by extrusion, and corner parts 50 which are formed by molding to connect the extruded straight parts 48 to each other in conformity with corners of the door frame 12. The extruded straight parts 48 are attached to an upper part, a rear vertical part and a front vertical part of the door frame 12, respectively, and have a generally U-shaped cross-section.

The present invention relates to a glass run adapted to be attached to the upper part of the door frame 12.

The door frame 12 has a channel part with a generally U-shaped cross-section along an outer side edge thereof for attaching the extruded straight parts 48 of the glass run 10A. Alternatively, a separately prepared channel with a generally U-shaped cross-section may be mounted on the door frame 12.

Figure 4:
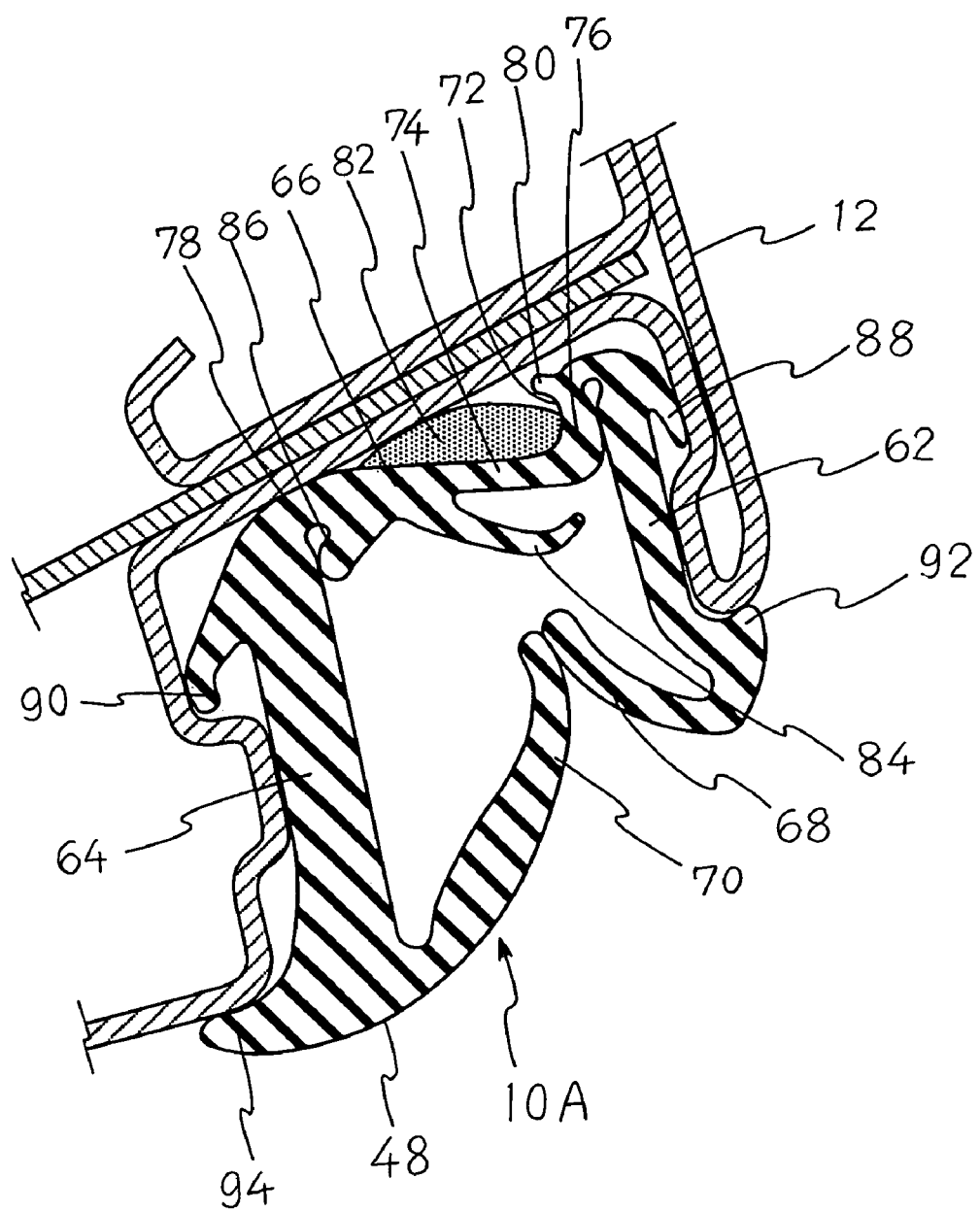
FIG. 4 is a cross-sectional view of one embodiment of a glass run in accordance with the present invention, which is attached to a door frame.

As shown in FIG. 4, the extruded straight part 48 of the glass run 10A includes an outer side wall 62, an inner side wall. 64 and a bottom wall 66. An outer seal lip 68 and an inner seal lip 70 respectively extend from open ends of the outer side wall 62 and the inner side wall 64 into an interior of the glass run 10A such that tip ends of these lips 68 and 70 contact each other when the glass run 10A is attached to the door frame 12.

The bottom wall 66 includes a central part 74, an outer side part 76 connected to the outer side wall 62, and an inner side part 78 connected to the inner side wall 64. The central part 74 of the bottom wall 66 has a plate-shaped cross-section, and an outer half of the central part 74 extends generally perpendicularly to the sliding direction of a door glass 16 (FIG. 5), whereas an inner half thereof gradually rises toward the inner side wall 64. And a shock absorbing lip 84 and a projection 86 respectively project from the inner half of the central part 74 obliquely towards an interior of the glass run 10A and the inner side wall 64.

The outer side part 76 of the bottom wall 66 extends upwardly and is connected to a base end of the outer side wall 62 with a thin-walled connection. An interior surface of the outer side part 76 is made flat and faces the outer side wall 62. When the glass run 10A is attached to the door frame 12, the outer side wall 62 readily bends along the thin-walled connection to facilitate the insertion of the glass run 10A in the door frame 12, and when the upper end of the door glass 16 pushes the central part 74 of the bottom wall 66 via the shock absorbing lip 84, the outer side part 76 readily bends along the thin-walled connection to enable the flexing of the central part 74, thereby absorbing the shock caused by the pushing of the door glass 16 against the bottom wall 66.

A seal lip 80 projects obliquely upwardly from an upper end of the outer side part 76, and a depressed part 72 is defined by the central part 74, the outer side part 76 and the inner side part 78 of the bottom wall 66.

A cushioning member 82 composed of a sponge body with a generally elliptical cross-section is secured in the depressed part 72 by bonding or fusion welding it to an exterior surface of the bottom wall 66.

And an outer lip 88 and an inner lip 90 are respectively provided in the outer side wall 62 and the inner side wall 64 for securely attaching the glass run 10A to the door frame 12.

When the glass run 10A thus arranged is attached in the channel part of the door frame 12, the outer lip 88 and the inner lip 90 respectively fit in steps formed in the channel part of the door frame 12 to prevent the glass run 10A from coming out of the channel part of the door frame 12, and provide a seal between the glass run 10A and the door frame 12.

An upper wall of the channel part of the door frame 12 gradually rises outwardly. When the glass run 10A is attached in the channel part of the door frame 12, a space with a generally triangular cross-section which gradually enlarges outwardly is defined by the upper wall of the channel part, the central part 74 of the bottom wall 66, and the upwardly extending outer side part 76. Therefore, the cushioning member 82 with a great thickness can be used so that the shock absorbing force for the door glass 16 can be enhanced. Furthermore, by virtue of the generally triangular space, the central part 74 is greatly flexed upwardly with the flection of the outer side part 76 so that the thick cushioning member 82 can be readily deformed.

Figure 5:
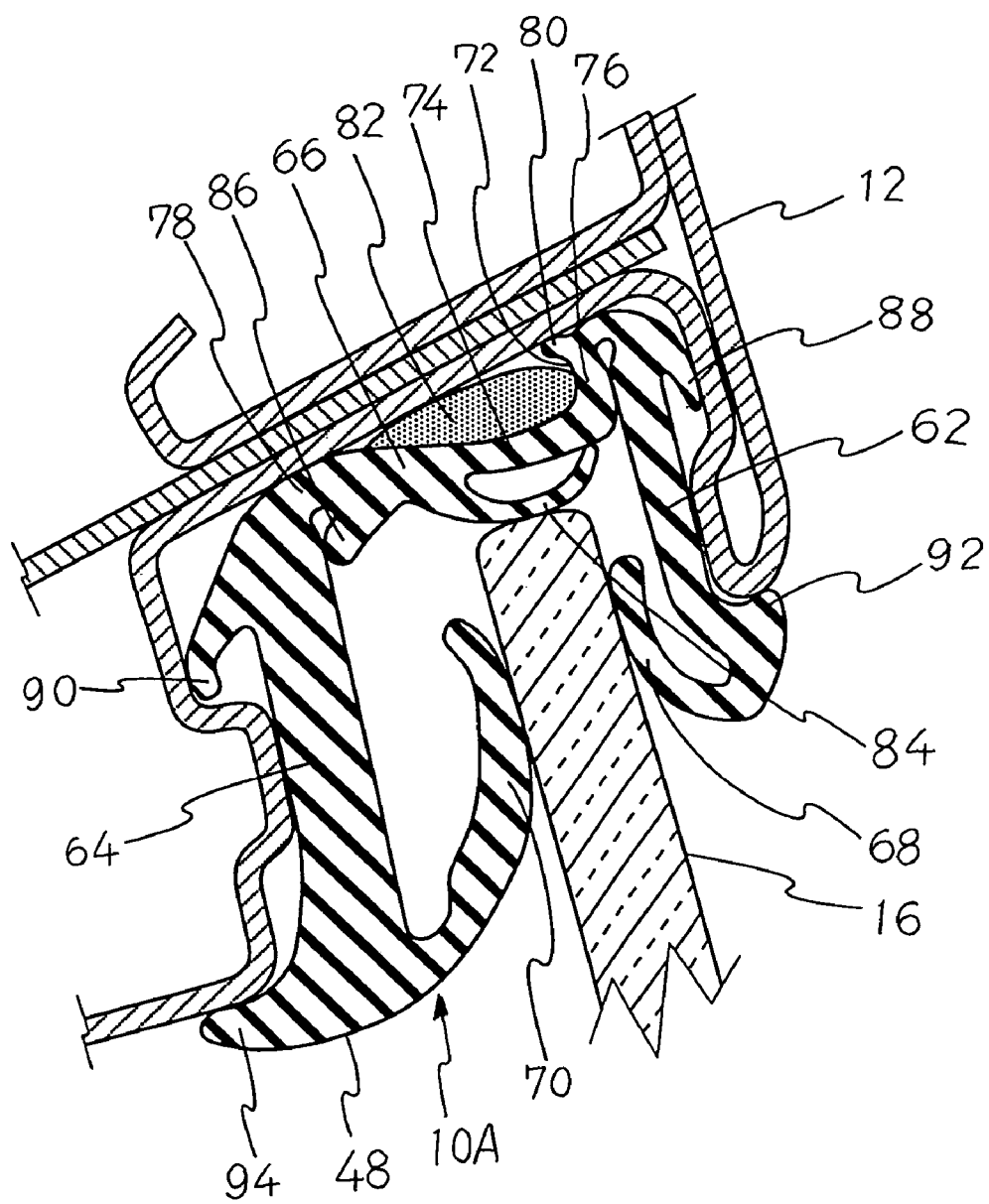
FIG. 5 is a cross-sectional view of one embodiment of a glass run in accordance with the present invention, in which an end of a door glass is inserted.

As shown in FIG. 5, when the door glass 16 enters the interior of the glass run 10A, the tip ends of the outer seal lip 68 and the inner seal lip 70 contact a periphery of the door glass 16 from both surfaces thereof to seal the same, and an upper end of the door glass 16 contacts and flexes the shock absorbing lip 84. As a result, shock caused by the contacting of the door glass 16 can be absorbed with the shock absorbing lip 84.

It is preferable that the shock absorbing lip 84 curves convexly toward an opening of the glass run 10A.

When the upper end of the door glass 16 pushes the shock absorbing lip 84, it is flexed, and the tip end thereof contacts an interior surface of the central part 74 of the bottom wall 66 to define a tubular part with an arc-shaped cross-section. The upper end of the door glass 16 pushes the curved shock absorbing lip 84 to flex it toward the tubular part, thereby absorbing the shock caused by pushing of the upper end of the door glass 16.

When the door glass 16 is further raised, the tip end of the shock absorbing lip 84 pushes an outer end of the central part 74 of the bottom wall 66 to flex the central part 74 upwardly along the inner side part 78. As a result, the cushioning member 82 secured to the exterior surface of the bottom wall 66 is deformed. Thus, the shock absorbing lip 84, the bottom wall 66 and the cushioning member 82 are flexed or deformed stepwise to absorb the shock caused by the pushing of the upper end of the door glass 16 securely, and consequently, occurrence of noises can be prevented.

And when the cushioning member 82 contacts the door frame 12, the seal lip 80 of the outer side part 76 of the bottom wall 66 also contacts the door frame 12, thereby absorbing the shock caused by the pushing of the upper end of the door glass 16, and enhancing the sealing properties between the glass run 10A and the door frame 12, and consequently, occurrence of noises can be prevented.

At this time, the upper end of the door glass 16 slides on an interior surface of the shock absorbing lip 84 toward the outer side wall 62 and closely contacts the outer seal lip 68, thereby enhancing the sealing properties between the door glass 16 and the outer seal lip 68. In addition, the level difference between the door glass 16 and the door frame 12 can be reduced.

Furthermore, since both the outer side part 76 of the bottom wall 66 and the cushioning member 82 contact the door frame 12, the glass run 10A can be held securely, and consequently, the glass run 10A can be prevented from slipping within the door frame 12 when the door glass 16 pushes the bottom wall 66 of the glass run 10A.

And the flat interior surface of the outer side part 76 closely contacts the outer side wall 62 to prevent the outer side wall 62 from tilting toward the interior of the glass run 10A. On the other hand, the projection 86 contacts and supports the inner side wall 64 to prevent the inner side wall 64 from tilting toward the interior of the glass run 10A.

The inner side wall 64 and the inner seal lip 70 are respectively formed greater and thicker than the outer side wall 62 and the outer seal lip 68. With this arrangement, the door glass 16 can be positioned outwardly to reduce the level difference between the door glass 16 and the door frame 12. Consequently, air resistance is decreased, occurrence of wind noises is reduced, and the aesthetic appearance is improved.

Surfaces of the shock absorbing lip 84, the outer seal lip 68 and the inner seal lip 70, which face the door glass 16, are coated with a low sliding resistance material such as urethane resin, silicon resin, etc. When the door glass 16 is raised and lowered, the sliding resistance of the door glass 16 can be decreased to prevent the occurrence of noises and the slipping of the glass run 10A from a predetermined attached position.

In addition, the material exhibiting a low sliding resistance is applied to an interior surface of the bottom wall 66, similarly to the seal lips 68 and 70, whereby the sliding resistance of the shock absorbing lip 84 against the bottom wall 66 can be reduced. The material exhibiting a low sliding resistance may be applied to both an interior surface of the outer side wall 62 and a rear surface of the outer seal lip 68, which faces the outer side wall 62. With this arrangement, the outer seal lip 68 can be prevented from sticking to the outer side wall 62.

In the drawings, reference numeral 92 designates an outer cover lip for covering an outer end of the door frame 12, and reference numeral 94 designates an inner cover lip for covering an inner corner of the door frame 12.

Next, a second embodiment of the present invention will be explained with reference to FIG. 6. A glass run 10B of the second embodiment is similar to the glass run 10A of the first embodiment. Therefore, differences between the present embodiment and the first embodiment will be mainly explained, and parts similar to those of the first embodiment are given the same numbers.

As shown, a bottom wall 96 of the glass run 10B includes a central part 98, an outer side part 100 and an inner side part 102. The central part 98 of the bottom wall 96 has a plate-shaped cross-section, and extends generally perpendicularly to the raising and lowering direction of the door glass. The outer side part 100 and the inner side part 102 of the bottom wall 96 respectively extend upwardly and are connected to the outer side wall 62 and the inner side wall 64 to have a generally U-shaped cross-section, and a depressed part 104 is defined with the outer side part 100, the central part 98 and the inner side part 102 of the bottom wall 96.

When the glass run 10B is attached to the door frame 12, both the outer side part 100 and the inner side part 102 further bend, respectively, to contact an upper wall of a channel part of the door frame 12, thereby holding the glass run 10B stably. In the attached state of the glass run 10B, the central part 98 of the glass run 10B extends generally in parallel with the upper wall of the channel part so that the depressed part 104 has a generally rectangular cross-section.

A cushioning member 106 composed of a sponge material and having a generally rectangular cross-section is secured in the depressed part 104 by bonding or fusion welding it to an exterior surface of the central part 98 of the bottom wall 96.

And a shock absorbing lip 107 and a projection 108 project from a connection between the central part 98 and the inner side part 102 obliquely towards an interior of the glass run 10B, and the inner side wall 64, respectively.

It is preferable that the shock absorbing lip 107 curves convexly toward an opening of the door glass 10B. When the upper end of the door glass contacts the shock absorbing lip 107, it is flexed, and a tip end thereof contacts an interior surface of the central part 98 of the bottom wall 96 to define a tubular part with an arc-shaped cross-section. The upper end of the door glass pushes the curved shock absorbing lip 107 to flex it toward the tubular part, thereby absorbing the shock caused by the pushing of the upper end of the door glass.

And when the upper end of the door glass is further raised to push the central part 98 of the bottom wall 96 via the shock absorbing lip 107, the central part 98 is flexed upwardly to deform the cushioning member 106. By flexing or deforming the shock absorbing lip 107, the bottom wall 96 and the cushioning member 106, respectively, the shock caused by the pushing of the upper end of the door glass can be absorbed, and consequently, occurrence of noises can be prevented.

When the glass run 10B is attached to the door frame 12, the projection 108 contacts and supports the inner side wall 64 to prevent the inner side wall 64 from tilting toward the interior of the glass run 10B.

Figure 6:
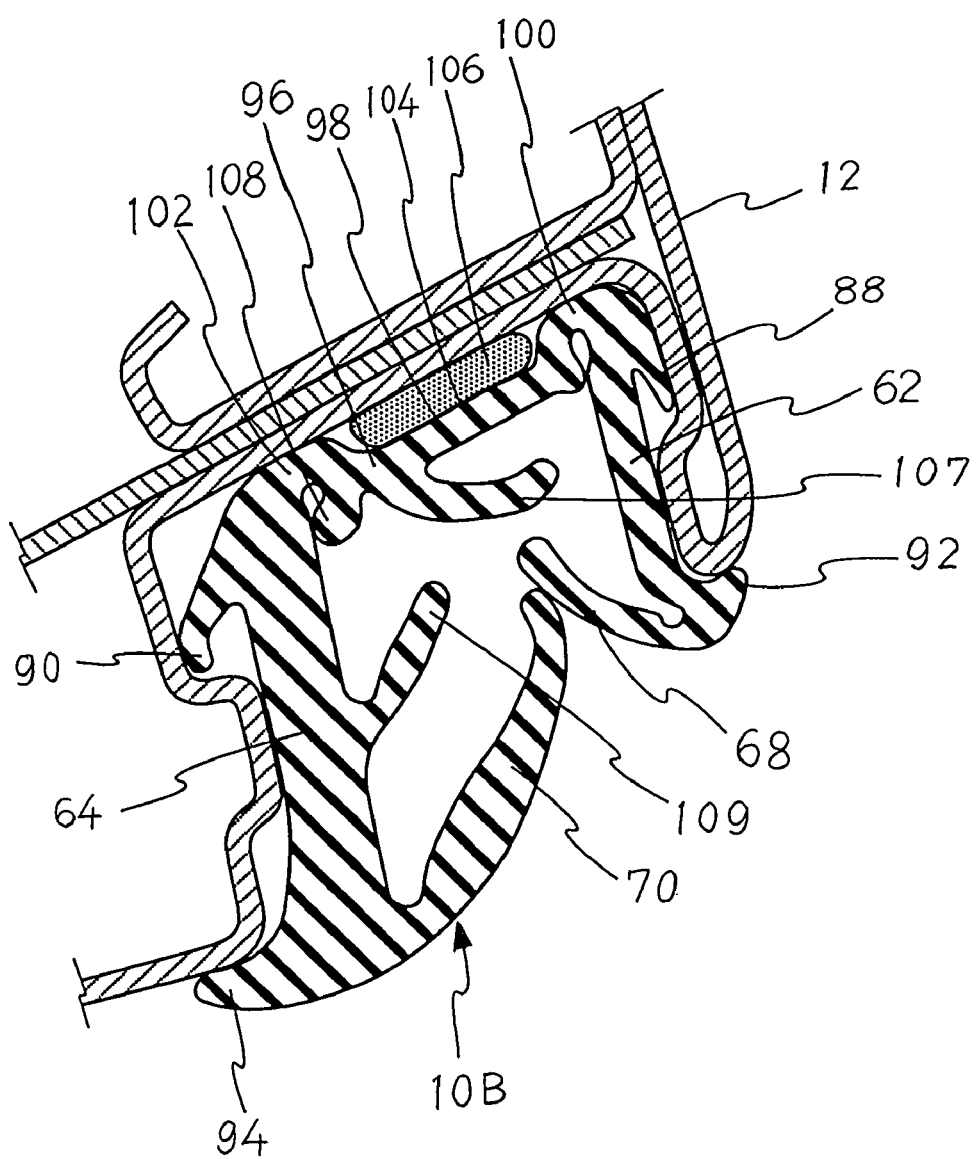
FIG. 6 is a cross-sectional view of another embodiment of a glass run in accordance with the present invention, which is attached to a door frame.

As shown in FIG. 6, the bottom wall 96 extends obliquely upwardly from the inner end to the outer end thereof in conformity with the upper wall of the channel part so that the door glass may shift outwardly, and consequently, the inner side wall 64 is much spaced from the closed door glass. And the inner seal lip 70 is made longer than the outer seal lip 68 to contact the door glass with a great contacting area. Accordingly, when the door glass is raised upwardly, the inner side wall 64 may be pulled with the inner seal lip 70 strongly, and tilt toward the interior of the glass run 10B. In the present embodiment, the projection 108 projecting from the bottom wall 96 supports the inner side wall 64 to securely prevent it from tilting toward the interior of the glass run 10B.

The projection 108 may be provided along a connection between the central part 98 and the outer side part 100 for preventing the outer side wall 62 from tilting toward the interior of the glass run 10B.

In FIG. 6, reference numeral 109 designates a projection for contacting and supporting the inner seal lip 70 to prevent the inner seal lip 70 from excessively flexing when the door glass enters the interior of the glass run 10B to push the inner seal lip 70 toward the inner side wall 64.

Figure 7:
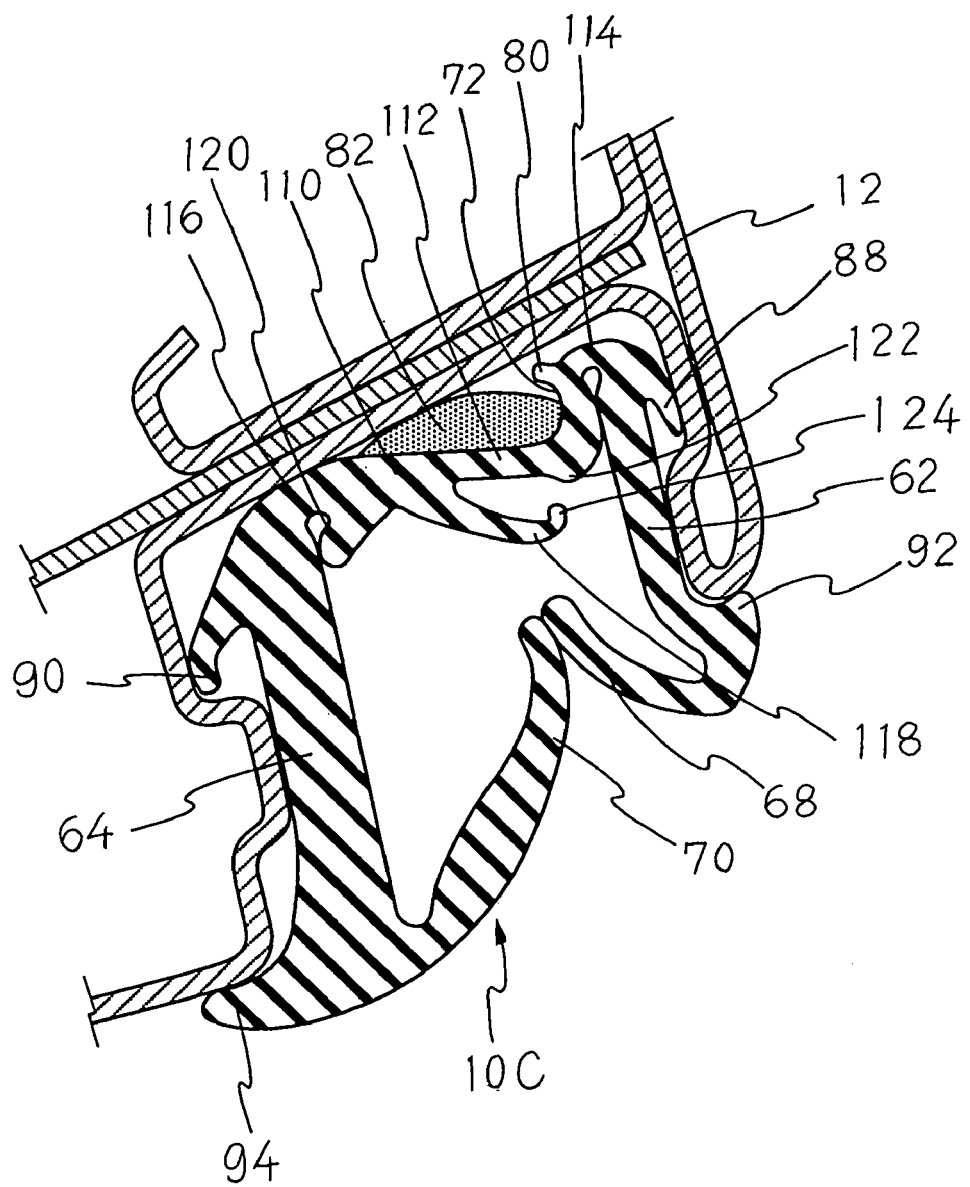
FIG. 7 is a cross-sectional view of a still another embodiment of a glass run in accordance with the present invention, which is attached to a door frame.

Next, a third embodiment of the present invention will be explained with reference to FIGS. 7 and 8. A glass run 10C of the third embodiment is similar to the glass run 10A of the first embodiment. Accordingly, differences between the present embodiment and the first embodiment will be mainly explained, and parts similar to those of the first embodiment are given the same numbers.

As shown, a bottom wall 110 of the glass run 10C includes a central part 112, an outer side part 114 and an inner side part 116. A shock absorbing lip 118 and a projection 120 project from an inner half of the central part 112 towards an interior of the glass run 10C and the inner side wall 64, respectively. A protrusion 122 protrudes from an outer end of an interior surface of the central part 112 towards the interior of the glass run 10C.

The shock absorbing lip 118 curves convexly toward an opening of the glass run 10C. A projection 124 is formed along a tip end of the shock absorbing lip 118 to project toward the bottom wall 110.

Figure 8:
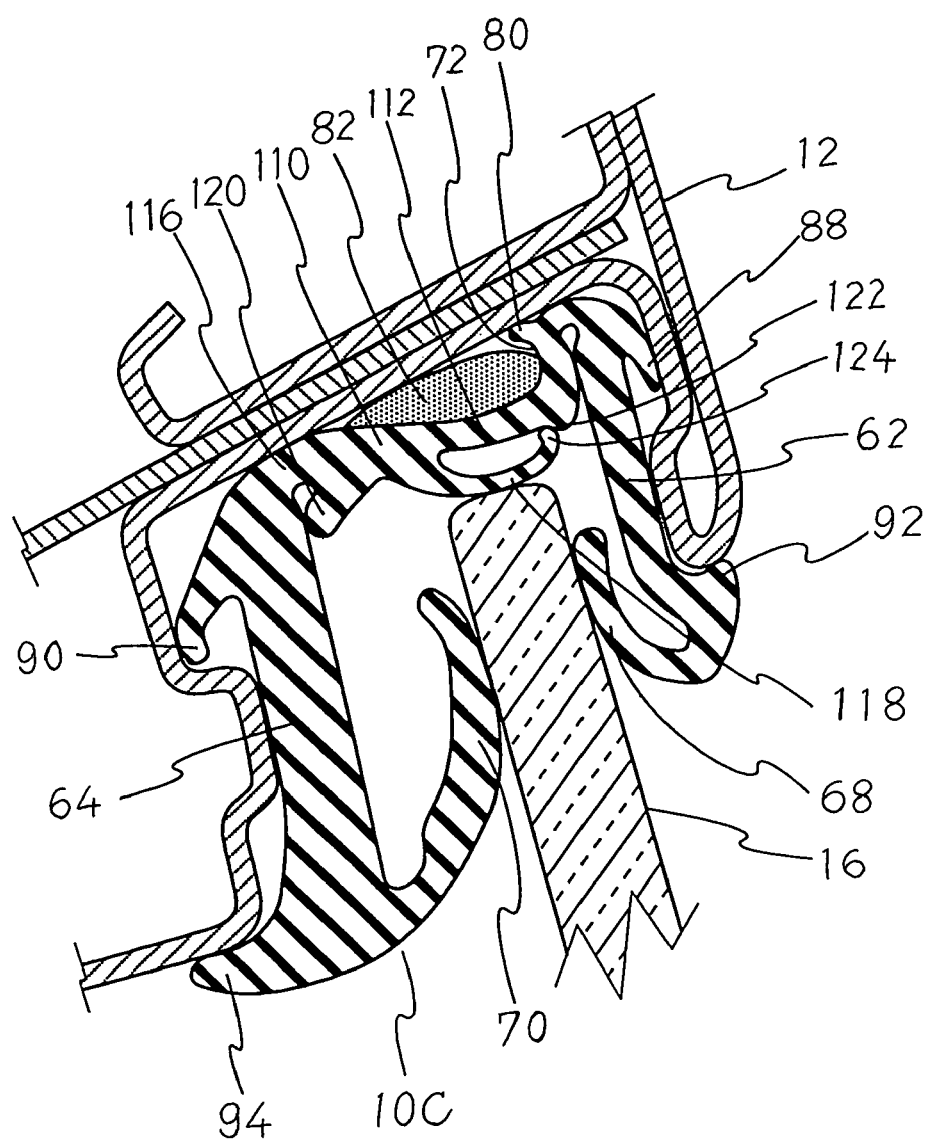
FIG. 8 is a cross-sectional view of a still another embodiment of a glass run in accordance with the present invention, in which an end of a door glass is inserted.

As shown in FIG. 8, when the upper end of the door glass 16 contacts the shock absorbing lip 118, it is flexed toward the interior surface of the central part 112, and the projection 124 of the shock absorbing lip 118 contacts and slides on the interior surface of the central part 112 to engage with the protrusion 122 of the central part 112 of the bottom wall 110, thereby defining a tubular part with an arc-shaped cross-section. When the upper end of the door glass 16 pushes the curved shock absorbing lip 118, the shock absorbing lip 118 of which the sliding is stopped with the protrusion 122 is further flexed to deform the tubular part between the shock absorbing lip 118 and the bottom wall 110, whereby the shock caused by the pushing of the upper end of the door glass 16 can be absorbed greatly, as compared with the case when the tip end of the shock absorbing lip does not engage with the bottom wall.

Next, the method for producing the glass run in accordance with the present invention will be explained with reference to the glass run 10A of the first embodiment.

The straight parts 48 and the corner parts 50 of the glass run 10A are composed of a solid material of synthetic rubber such as EPDM rubber, thermoplastic elastomer such as olefin elastomer, or a soft synthetic resin such as soft vinyl chloride, etc.

The straight parts 48 are formed by extruding a solid material using an extruder, and cutting extruded bodies to predetermined lengths.

In the case of synthetic rubber, after extrusion, it is heated for vulcanization in a vulcanization chamber with hot air, high frequency wave, etc, whereas in the case of thermoplastic elastomer or soft synthetic resin, it is cooled for solidification. Then, a low sliding resistance material is applied to surfaces of the outer seal lip 68, the inner seal lip 70, the shock absorbing lip 84 and the bottom wall 66 by coating or bonding.

Next, the corner part 50 is molded by placing ends of the extruded straight parts 48 in a mold, and injecting a solid material in a cavity of the mold. The molded corner part 50 has a generally identical cross-section to that of each of the extruded straight parts 48. It is preferable that the material for the molded part is of the same kind as the material for the extruded parts. In the case of thermoplastic elastomer or soft synthetic resin, the molded part is welded to the extruded parts with heat and pressure of the material for the molded part, which is in a molten state when injected.

In the case of synthetic rubber, after injected into the mold, the mold is heated for vulcanization of the synthetic rubber. Due to vulcanization, the extruded parts and the molded part, which can be composed of an identical material or materials of the same kind, can become an integral body. Where the extruded parts are composed of synthetic rubber, the molded part can be composed of thermoplastic elastomer.

As described above, in accordance with the present invention, the shock absorbing lip projects from an interior surface of the bottom wall of the glass run toward an interior thereof, an exterior surface of the bottom wall defines a space with the door frame, and a cushioning member is provided in the space between the bottom wall and the door frame. When the door glass is raised and an end of the door glass pushes the shock absorbing lip, the shock absorbing lip is flexed to absorb the shock caused by the pushing of the door glass, and when the end of the door glass further pushes the shock absorbing lip, it contacts the interior surface of the bottom wall to flex the bottom wall, thereby deforming the cushioning member. By flexing or deforming the shock absorbing lip, the bottom wall, and the cushioning member in this order, the shock caused by the pushing of the door glass against the glass run can be absorbed securely.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for use in a motor vehicle, and which is adapted to be attached along an inner periphery of a door frame of a vehicle door for guiding a door glass as it is raised and lowered, comprising
an outer side wall, an inner side wall and a bottom wall, which define a generally U-shaped cross-section;
an outer seal lip and an inner seal lip which respectively project from distal ends of said outer side wall and said inner side wall into an interior defined by said outer side wall, said inner side wall and said bottom wall;
said bottom wall including a shock absorbing lip which obliquely projects from one of an inner side end and an outer side end of said bottom wall into said interior, and a depressed part provided in an exterior surface thereof for defining a space with the door frame; and
a cushioning member which is provided in said depressed part of said bottom wall,
wherein said shock absorbing lip curves convexly toward an opening of the glass run such that when an end of the door glass contacts said shock absorbing lip, a tip end of said shock absorbing lip contacts an interior surface of said bottom wall and forms a tubular part defined by said shock absorbing lip and said bottom wall, said tubular part is adapted to absorb shock caused by the pushing of said end of the door glass against said tubular part, said bottom wall is adapted to extend obliquely to the door frame to define said space with the door frame, a cross section of said space gradually enlarges from said inner side end to said outer side end of said bottom wall, said bottom wall is arranged such that when said glass run is attached to the door frame, said inner side end of said bottom wall, which is connected to said inner side wall, contacts the door frame, whereas said outer side end of said bottom wall, which is connected to said outer side wall, does not contact the door frame, and when said end of the door glass pushes said bottom wall, said outer side end of said bottom wall contacts the door frame and said cushioning member is compressed, thereby absorbing shock caused by the pushing of said end of the door glass against said bottom wall, and said bottom wall includes a central part, an outer side part and an inner side part, said outer side part and said inner side part are integrally formed with said central part, a portion of said outer side part bends and is connected to a base end of said outer side wall, and a seal lip projects from said outer side part of said bottom wall over said depressed part in such a manner as to contact the door frame when said end of the door glass pushes said bottom wall, and wherein said cushioning member is partially disposed between said seal lip and said bottom wall in a direction defined by a raising and lowering direction of the door glass.

2. A glass run as claimed in claim 1, wherein said bottom wall further includes a projection which obliquely projects from said interior surface of said bottom wall towards one of said inner side wall and said outer side wall such that when said glass run is attached to the door frame, said projection contacts said one of said inner side wall and said outer side wall.

3. A glass run as claimed in claim 1, wherein said shock absorbing lip projects from said inner side end of said bottom wall, and said bottom wall further includes a projection which obliquely projects from said inner side end of said bottom wall towards said inner side wall such that when said glass run is attached to the door frame, said projection contacts said inner side wall.

4. A glass run as claimed in claim 1, wherein said bottom wall further includes a protrusion which protrudes from said interior surface of said bottom wall at one of said inner side end and said outer side end of said bottom wall such that when said end of the door glass contacts said shock absorbing lip, said tip end of said shock absorbing lip engages with said protrusion provided in said bottom wall.

5. A glass run as claimed in claim 4, wherein said shock absorbing lip has a projection along said tip end thereof for engaging with said protrusion provided in said bottom wall when said end of the door glass contacts said shook absorbing lip.

* * * * *